(12) United States Patent
Vetter et al.

(10) Patent No.: US 9,627,140 B2
(45) Date of Patent: Apr. 18, 2017

(54) CAPACITOR COMPONENT

(75) Inventors: Harald Vetter, Heidenheim (DE); Wilhelm Grimm, Roth (DE)

(73) Assignee: EPCOS AG, Munich (DE)

( * ) Notice: Subject to any disclaimer, the term of this patent is extended or adjusted under 35 U.S.C. 154(b) by 428 days.

(21) Appl. No.: 14/343,837

(22) PCT Filed: Sep. 6, 2012

(86) PCT No.: PCT/EP2012/067361
§ 371 (c)(1),
(2), (4) Date: Jun. 27, 2014

(87) PCT Pub. No.: WO2013/034616
PCT Pub. Date: Mar. 14, 2013

(65) Prior Publication Data
US 2014/0301016 A1    Oct. 9, 2014

(30) Foreign Application Priority Data

Sep. 7, 2011 (DE) .......... 10 2011 112 712
Nov. 15, 2011 (DE) .......... 10 2011 118 580

(51) Int. Cl.
*H01G 4/38* (2006.01)
*H01G 4/30* (2006.01)

(52) U.S. Cl.
CPC .......... *H01G 4/30* (2013.01); *H01G 4/38* (2013.01); *Y10T 29/43* (2015.01)

(58) Field of Classification Search
CPC .......... H01G 4/228; H01G 4/30; H01G 4/005; H01G 4/06; H01G 4/38
See application file for complete search history.

(56) References Cited

U.S. PATENT DOCUMENTS

| 2,464,377 | A | 3/1949 | Cohen et al. |
| 4,447,854 | A | 5/1984 | Markarian |
| 7,542,264 | B2 * | 6/2009 | Oshima .......... H01G 4/232 333/185 |
| 2010/0321859 | A1 * | 12/2010 | Hosking .......... H01G 4/32 361/301.5 |

FOREIGN PATENT DOCUMENTS

| DE | 823310 C | 12/1951 |
| DE | 1148022 B | 5/1963 |
| DE | 1148023 B | 5/1963 |
| DE | 3319333 A1 | 11/1984 |

(Continued)

OTHER PUBLICATIONS

Lauber, "Die Verteilung der elastischen Spannungen in Kunststof-folien-Rollen," Forsch. Ing. Wes 31 (1965) Nr. 6, pp. 182-186.

*Primary Examiner* — Nguyen Ha
(74) *Attorney, Agent, or Firm* — McDermott Will & Emery LLP (57) ABSTRACT

The invention relates to a capacitor component having a first integrated capacitor (C1) and an integrated Y capacitor, wherein the Y capacitor has a second capacitor (C2) and a third capacitor (C3), and the second and third capacitor (C2, C3) are connected in series with one another and in parallel with the first capacitor (C1). The invention further relates to a method for producing such a capacitor component.

13 Claims, 7 Drawing Sheets

(56) References Cited

FOREIGN PATENT DOCUMENTS

| | | |
|---|---|---|
| DE | 3609040 A1 | 9/1987 |
| DE | 4433540 A1 | 3/1996 |
| DE | 19510624 C1 | 8/1996 |
| DE | 19847028 A1 | 4/2000 |
| DE | 10240084 A1 | 3/2004 |
| DE | 102005050726 A1 | 5/2007 |
| EP | 0517935 A1 | 12/1992 |
| JP | S526967 A | 1/1977 |
| JP | S529855 | 1/1977 |
| JP | S55176550 U | 12/1980 |
| JP | S6355423 U | 4/1988 |
| JP | H02169242 A | 6/1990 |
| JP | H0312424 U | 2/1991 |
| JP | H05226183 A | 9/1993 |
| JP | H11317320 A | 11/1999 |
| JP | 2000012370 A | 1/2000 |
| JP | 2003521115 A | 7/2003 |
| JP | 2007242860 A | 9/2007 |
| JP | 2010251400 A | 11/2010 |
| JP | 2010267775 A | 11/2010 |
| WO | 2004/021567 A1 | 3/2004 |
| WO | 2006/116967 A2 | 11/2006 |

* cited by examiner

CAPACITOR COMPONENT

The invention relates to a capacitor component having a plurality of capacitors, and to methods for producing the capacitor component.

The capacitor component is preferably a power capacitor, which for example is suitable for use in a radially symmetrical installation space. DC-link capacitors and Y capacitors can be used in the intermediate circuit of a convertor. The purpose of the Y capacitors is to suppress asymmetrical interference.

Previously, the DC-link capacitors and the Y capacitors were separate components having their own housings and own power supply. Such a design has a poor volume filling factor. The volume filling factor indicates the ratio of the geometric volume of a component or module to the volume actually technically used.

An object of the present invention is to specify a capacitor component having improved properties, for example a higher volume filling factor, and methods for producing a capacitor component of this type.

This object is achieved in accordance with the invention by a capacitor component having the features of claim 1. Further, production methods for a capacitor component according to the invention are disclosed. Advantageous embodiments of the invention are disclosed in the further claims.

A capacitor component is specified which has an integrated first capacitor and an integrated Y capacitor. The Y capacitor has a second capacitor and a third capacitor, wherein the second and the third capacitor are connected in series with one another and in parallel with the first capacitor. A capacitor may then be referred to, for example, as being "integrated into a component" if the component and the capacitor have at least a common voltage supply or a common housing.

The first capacitor has a first capacitance. The second capacitor has a second capacitance. The third capacitor has a third capacitance.

In the case of a Y capacitor, an electrode of the second capacitor and an electrode of the third capacitor are preferably connected to a reference potential.

The present invention makes it possible to integrate a first capacitor and a Y capacitor in a single component. The system integration can thus be improved. The basic concept of the system integration is to combine a number of individual component elements into as few components as possible, such that the volume occupied by the components can be minimized.

The first capacitor, for example, is a DC-link capacitor. DC-link capacitors and Y capacitors can be used in the intermediate circuit of a convertor. The purpose of the Y capacitors is to suppress asymmetric interference.

Due to the integration of the first capacitor and of the Y capacitor in a single component, a considerably increased volume filling factor compared with a capacitor bank having separate components is preferably achieved.

In an embodiment, the capacitor component has at least one busbar for electrically contacting the capacitors. The capacitor component preferably has a first and a second busbar. The two busbars are connected at least to the first capacitor. The busbars enable a contacting of the first capacitor and of the Y capacitor, preferably simultaneously. In this case, the capacitor component is characterized in that a common connection can be used for the joint contacting of the first capacitor and of the capacitors of the Y capacitor. The system integration is improved accordingly, since it is not necessary to provide each capacitor with its own connection point to the power supply.

In an embodiment, the capacitor component is annular. Alternatively, the capacitor component according to the invention may also be flat or may have any other geometric form. An annular capacitor component is suitable in particular for installation in a radially symmetrical installation space, for example an installation space of a wheel hub motor. The first capacitor, the second capacitor, the third capacitor and the busbars can be formed annularly. At least one element selected from first capacitor, second capacitor, third capacitor and busbars can be formed annularly. Preferably, the first capacitor, the second capacitor, the third capacitor and the busbars are annular.

Further, the first capacitor, the Y capacitor and/or the busbars can be formed radially symmetrically with respect to a common axis of symmetry. At least one element selected from first capacitor, second capacitor, third capacitor and busbars can be formed radially symmetrically with respect to a common axis of symmetry. Preferably, the first capacitor, the second capacitor, the third capacitor and the busbars are radially symmetrical with respect to a common axis of symmetry.

In an embodiment, the capacitor component has a main body. The main body preferably has a film stack comprising a number of inner electrodes and dielectric films arranged therebetween. The dielectric films are preferably polymer films. The dielectric films can be metallized on at least one outer face. In this case, the inner electrodes are formed by the metallization of the dielectric films. The metallized polymer films are preferably stacked above one another in such a way that dielectric layers and metallic layers alternate in the film stack along the surface normal of the films.

The capacitors of the Y capacitor can be formed from the films of the main body. For this purpose, the main body may have first, second and third films for forming the first, second and third capacitors. Alternatively, the capacitors of the Y capacitor can also be formed by the busbars, further metal foils and further dielectric films. For example, the further metal foils can be aluminum foils. The further dielectric films may comprise polyamide.

Further, the main body of the capacitor component may have means for the electric connection of the film stack, for example metallizations. The metallizations can be arranged on an outer face of the main body.

The first capacitor can be part of the main body. The second and the third capacitor can be fitted on the main body of the capacitor component or formed by the main body.

In an embodiment, at least one insulating separation film is arranged in the main body. In this case, the Y capacitor can be formed particularly easily by the main body. Due to the insulating separation film, the film stack can be separated into a number of capacitances insulated from one another. The film stack is preferably separated into a first, a second and a third capacitance, wherein the first capacitance is formed by first metallized dielectric films, the second capacitance is formed by second metallized dielectric films, and the third capacitance is formed by third metallized dielectric films. Here, each capacitance is preferably formed by inner electrodes of the film stack, wherein a dielectric film is arranged in each case between two inner electrodes.

The first capacitance is preferably the capacitance of the first capacitor. The second capacitance is preferably the capacitance of the second capacitor, and the third capacitance is preferably the capacitance of the third capacitor.

Alternatively, the Y capacitor can be fitted on the main body of the capacitor component. In this case, the Y capacitor can have films that are not part of the film stack. For example, the Y capacitor can be arranged on the film stack. For example, two busbars can be arranged on the main body, and the Y capacitor can be formed by the two busbars and also at least one metal foil and dielectric films, which are arranged between the busbars.

In this embodiment, the Y capacitor preferably has a metal foil, a first dielectric film and a second dielectric film. The metal foil is provided for connection to the reference potential. The metal foil is encased between the first and the second dielectric film. The metal foil and the two dielectric films can be arranged between the two busbars in such a way that the second capacitor is formed by the first busbar, the metal foil and the first dielectric film, and the third capacitor is formed by the second bus bar, the metal foil and the second dielectric film. The metal foil is provided merely for the electrical connection to the reference potential, but is not connected to the two busbars. Such a design is also referred to as "dielectric coupling" of the metal foil to the two busbars.

In an embodiment, the capacitor component has a first and a second outer face. The first and the second outer face can be covered at least in part by a metal layer. This metal layer enables an electrical contacting of the metal foils in the film stack. This metal layer is also referred to as a schoopage layer. It is conventional in self-healing capacitors.

The first and the second outer face are preferably a first and a second end face. The capacitor component preferably surrounds an axis, wherein the first and the second end face are arranged perpendicularly to this axis and are each covered at least in part by a metal layer.

In the case of a flat capacitor component, the inner electrodes of a film stack are arranged in flat planes with dielectric films arranged therebetween. Here, two mutually opposed outer faces of the film stack, which are arranged parallel to the surface normals of the dielectric films, can be covered at least in part by a metal layer.

In an embodiment, the metal layer arranged on the first outer face can be separated by the first electrically insulating separation film into a first and a second sub-region, wherein the first and the second sub-region are electrically insulated from one another. The metal layer arranged on the second outer face can be separated by the second electrically insulating separation film into a first and a second sub-region, wherein the first and the second sub-region are electrically insulated from one another. Further, the first busbar can be electrically connected to the first sub-region of the metal layer on the first outer face.

Further, the second busbar can be connected to the first sub-region of the metal layer on the second outer face and to the second sub-region of the metal layer on the first outer face. In this case, the second busbar can be electrically connected to an electrical contact point in the first sub-region of the metal layer on the second outer face and to a contact point in the second sub-region of the metal layer on the first outer face, for example by means of a welded connection.

The second sub-region of the metal layer on the second outer face can be connected to the reference potential. The three capacitors can thus be connected by means of the metal layers on the first and on the second outer face and by means of two busbars, which are contacted with these metal layers. This design is characterized by a very high volume filling factor. The number of elements for the electrical contacting is minimized and a simpler and thus more cost-effective design is selected, which additionally enables a compact structure of the capacitor component, in which an available volume is practically completely used technically.

At least the second and the third capacitor are preferably self-healing, such that a short circuit at a single point between two metallized films does not lead to destruction of the capacitor. Here, in the case of a short circuit at a single point between two films as a result of high temperatures, both the dielectric at the breakdown point and also the metallization preferably vaporize, with the result that a hole is created in the film stack, which does not lead to the destruction of the capacitor.

In an embodiment, the two busbars, the first capacitor, the second capacitor and the third capacitor annularly surround a common axis. At least one of the two busbars has a larger diameter than the first, the second and the third capacitor. Both busbars preferably have a larger diameter than the first, the second and the third capacitor. In this case, the busbars are arranged further outwardly in the radial direction than the first, the second and the third capacitor.

Alternatively, the two capacitors of the Y capacitor can be arranged between the two busbars. In this case, the first capacitor preferably has the smallest diameter. A first busbar preferably has a diameter that is larger than the diameter of the first capacitor. The second and the third capacitor preferably in turn have a diameter that is larger than the diameter of the first busbar. The second busbar preferably has the largest diameter.

In an embodiment, a number of metal foils are arranged between the two busbars and are each encased between two dielectric films. A number of second and third capacitors of the Y capacitor can be formed by a number of dielectric films, metal foils and by the two busbars. In each case, a second and a third capacitor can be connected in series with one another. The pairs of second and a third capacitor formed in this way are preferably connected in parallel with the further pairs of second and third capacitors. Due to the connection in parallel of a number of pairs of in each case a second and a third capacitor, the total capacitance of the Y capacitor can be considerably increased.

A further aspect of the present invention concerns a capacitor component which has an annular main body having an outer face, on which a busbar is arranged. The annular main body preferably surrounds an axis, preferably an axis of symmetry.

The outer face, on which the busbar is arranged, is preferably the face of the main body of which the surface normal points away from the axis of symmetry in the radial direction. In particular, the surface normal of the outer face, on which the busbar is arranged, can run perpendicularly to the axis. The main body can have inner electrodes. The busbar can be contacted with the inner electrodes and can therefore serve for the joint contacting of inner electrodes.

The end faces of the main body, that is to say preferably the faces of which the surface normals are parallel to the axis of symmetry, may each have a schoopage layer which is contacted with the inner electrodes. Further, the busbar can have contact elements, which provide contact between the busbar and the schoopage layer. The busbar may additionally have further contact elements for contacting an external voltage source and/or further contact elements for contacting a ground potential.

A first and a second busbar can preferably be arranged on the outer face of the main body. Each of the two busbars surrounds the main body annularly.

Each of the two busbars can have the above-described contact elements. A first busbar can be contacted with a first schoopage layer on a first end face. A second busbar can be contacted with a second schoopage layer on a second end face. If, in this case, a first potential is applied to the first busbar and a second potential is applied to the second busbar, a potential difference is thus produced between the inner electrodes of the main body, which are contacted with the first busbar, and the inner electrodes of the main body, which are contacted with the second busbar.

An annular capacitor component of this type can have all the structural and functional features of the capacitor component described further above.

In particular, the capacitor component with the annular main body and the busbar arranged on the outer face can be formed as a capacitor component as described above, which has an integrated first capacitor and an integrated Y capacitor. In a further embodiment the capacitor component with the annular main body and the busbar arranged on the outer face is not formed as a capacitor component having an integrated first capacitor and an integrated Y capacitor. For example, the capacitor component has merely a first capacitor.

The invention further relates to a further embodiment of the films of the second and third capacitor, which can be combined with any of the superstructures, described here, of the capacitor component. In accordance with the further embodiment the films which form the second and the third capacitor can be different from the films which form the first capacitor.

In particular, the second and the third capacitor can each have a metal foil, a dielectric film and a partly metallized film wound above one another. The partly metallized film may have two metallized regions and a non-metallized region, which separates the two metallized regions from one another. A first capacitance of the respective capacitor can be formed by a first metallized region of the partly metallized film and by the metal foil, wherein the dielectric film is further arranged between the first metallized region and the metal foil. A second capacitance of the respective capacitor can be formed by a second metallized region of the partly metallized film and by the metal foil, wherein the dielectric film is further arranged between the second metallized region and the metal foil.

The first and the second capacitance of the respective capacitor can be connected in series as an inner series circuit and may thus define the total capacitance of the second or third capacitor.

In accordance with this further embodiment the second and the third capacitor may have self-healing and non-self-healing regions. In particular, the regions between the metallized regions of the partly metallized film and the metal foil may be self-healing. The regions between the non-metallized region of the partly metallized film and the metal foil may be non-self-healing.

The present invention further relates to a method for producing a capacitor component. A first capacitor can be formed from inner electrodes having first dielectric films arranged therebetween. A first electrically insulating separation film can be fitted on the first capacitor. A second capacitor formed of inner electrodes having second dielectric films arranged therebetween can be formed on the first separation film. A separation film can be fitted on the second capacitor. A third capacitor formed of inner electrodes having third dielectric films arranged therebetween can be formed on the second separation film. Further, two busbars can be slid onto the film stack comprising the first, second and third capacitor and can be electrically contacted with the capacitors. Accordingly, to form the three capacitors, a film stack is formed that is separated by the two separation films into the three capacitances. The inner electrodes can be formed by metallizations of the dielectric films. The inner electrodes of the film stack accordingly form the first, the second and the third capacitor. The two busbars enable an electrical contacting of the capacitors.

In an alternative method for producing a capacitor component, a first capacitor formed of inner electrodes having dielectric films arranged therebetween can be formed. The inner electrodes may be metallizations of the dielectric films. Two busbars can be slid onto the first capacitor and electrically contacted with the capacitor. A metal foil, which is encased between two dielectric films, can be inserted between the two busbars. A capacitor component is accordingly fabricated, in which the inner electrodes of the film stack form the first capacitor and in which the busbars slid onto this film stack, together with the metal foil arranged between the busbars and together with the dielectric films, form the second and the third capacitor.

The invention will be explained in greater detail hereinafter on the basis of exemplary embodiments and associated figures. The figures show various exemplary embodiments of the invention on the basis of schematic illustrations not drawn to scale.

Figure 1:
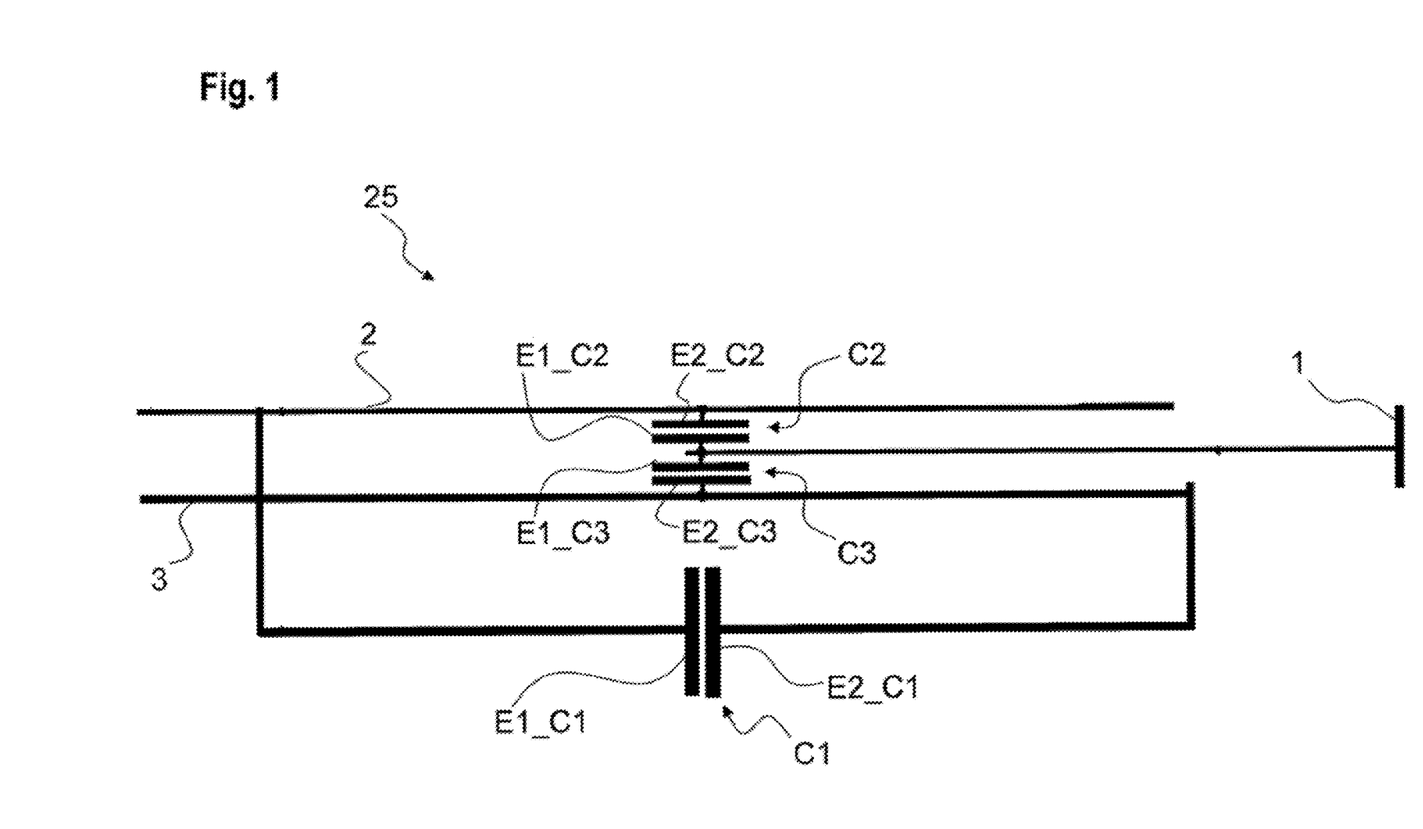
FIG. 1 shows an equivalent circuit diagram of a capacitor component according to the invention.

FIG. 1 shows an equivalent circuit diagram of a capacitor component 25. The capacitor component 25 has a first capacitor C1 and a second capacitor C2 and a third capacitor C3. The second and the third capacitor C2, C3 are connected in series with one another and in parallel with the first capacitor C1. An electrode E1_C2 of the second capacitor C2 and an electrode E1_C3 of the third capacitor C3 are each connected via a ground connection to a reference potential 1.

Further, the capacitor component 25 has two busbars 2, 3. An electrode E2_C2 of the second capacitor C2, said electrode not being connected to the reference potential 1, is connected to a first busbar 2. Further, an electrode E2_C3 of the third capacitor C3, said electrode not being connected to the reference potential 1, is connected to a second busbar 3. Further, an electrode E1_C1 of the first capacitor C1 is connected to the first busbar 2 and the second electrode E2_C1 of the first capacitor C1 is connected to the second busbar 3.

The busbars 2, 3 serve for the electrical contacting of the capacitor component 25. They connect the capacitors C1, C2, C3 to a power supply and/or to IGBT modules (IGBT=insulated-gate bipolar transistor).

The capacitor component 25 may be a power capacitor. The first capacitor C1 may be a DC-link capacitor, for example, which is used in the intermediate circuit of a converter for the energy coupling of a number of electrical networks.

The second and the third capacitor C2, C3 are parts of a Y capacitor. A Y capacitor has two capacitors C2, C3 connected in series with one another, wherein an electrode E1_C2, E1_C3 of the capacitors C2, C3 respectively is connected to a reference potential 1. Y capacitors suppress asymmetric interference signals.

The Y capacitor and the first capacitor C1 are integrated in a common capacitor component 25.

Figure 2:
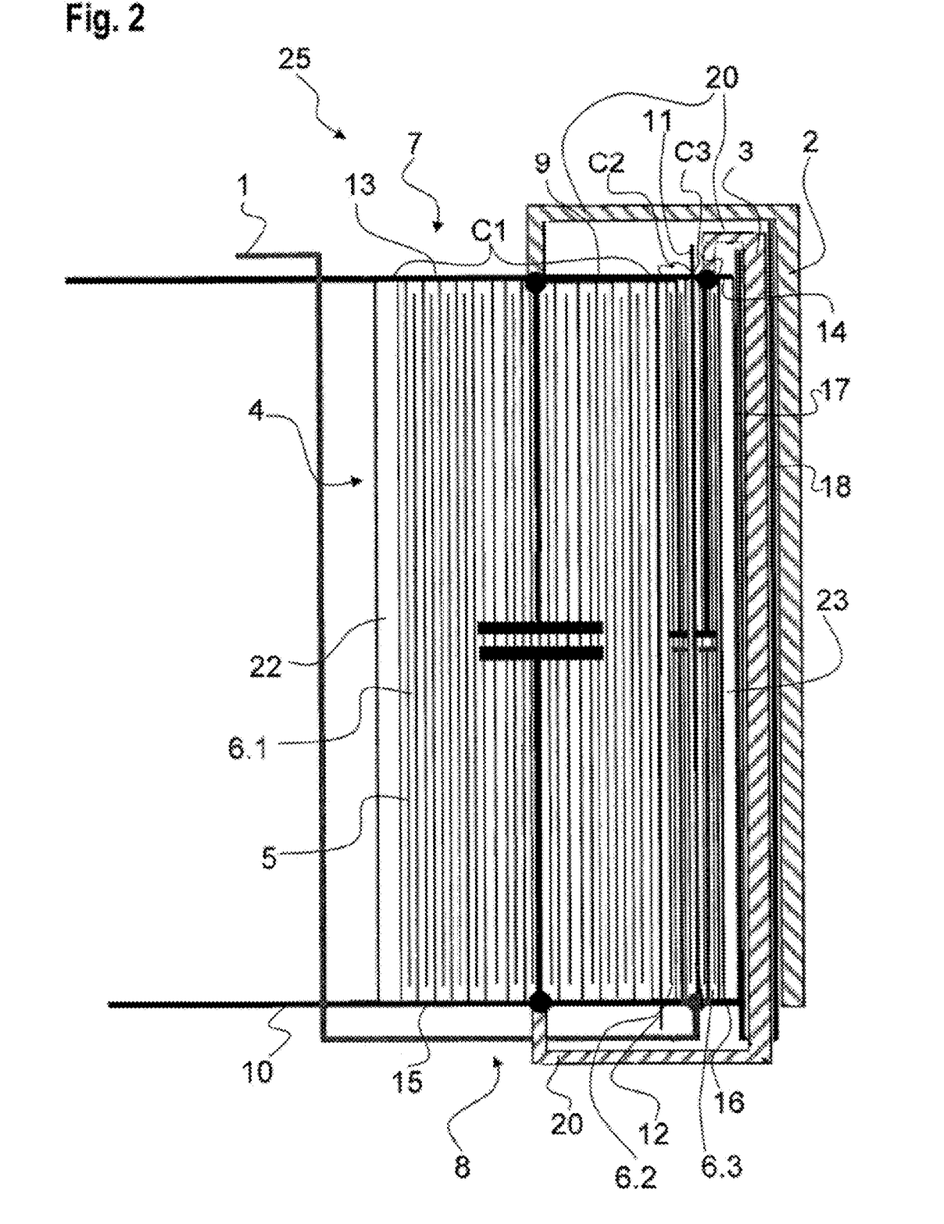
FIG. 2 shows a detail of a first exemplary embodiment of a capacitor component according to the invention.

FIG. 2 shows a detail of a first exemplary embodiment of the capacitor component 25, in which the equivalent circuit diagram according to FIG. 1 is implemented. The design shown in FIG. 2 may be a cross section through an annular capacitor component 25 or a section through a planar capacitor component 25.

The capacitor component 25 has a film stack 4, which comprises a number of inner electrodes 5 and first, second and third dielectric films 6.1, 6.2, 6.3 arranged therebetween. The films 6.1, 6.2, 6.3 each comprise a dielectric material, for example polymer. In particular, the films 6.1, 6.2, 6.3 are three polymer films. At least one outer face of the films 6.1, 6.2, 6.3 in each case has a metallization. The metallizations of the dielectric films 6.1, 6.2, 6.3 in this case form the inner electrodes 5.

The first, second and third films 6.1, 6.2, 6.3 are now stacked in such a way that metallizations and dielectric regions alternate along the surface normal of the films 6.1, 6.2, 6.3. A first and a second end face 7, 8 of the film stack, which are parallel to the surface normal of the dielectric films 6.1, 6.2, 6.3, are covered by a metal layer 9, 10, which is known as the schoopage layer. To form the schoopage layer, the first and the second end face can be metallized with tin, zinc and/or aluminum (schooped), that is to say electrically contacted, by means of what is known as the schoopage method. The films 6.1, 6.2, 6.3 are further formed in such a way that each inner electrode 5 is contacted either with the first end face 9 or with the second end face 10. The inner electrodes 5 are arranged in such a way that an inner electrode 5 is connected to the first end face 9 and an inner electrode 5 is connected to the second end face 10 in an alternating manner along the stack direction of the film stack 4. The stack direction of the film stack 4 corresponds here to the surface normal of the dielectric films 6.1, 6.2, 6.3.

Further, the film stack 4 comprises two electrically insulating separation films 11, 12. The film stack 4 is separated into the capacitances of the first capacitor C1, the second capacitor C2 and the third capacitor C3 by the electrically insulating separation films 11, 12. The first separation film 11 further separates the first metal layer 9, which covers the first end face 7 of the film stack 4, into two sub-regions 13, 14. The second separation film 12 separates the second metal layer 10, which covers the second end face 8 of the film stack 4, likewise into two sub-regions 15, 16.

Further, the capacitor component 25 comprises two busbars 2, 3. The busbars 2, 3 are separated from the film stack 4 by a first electric insulation layer 17. Further, a second electric insulation layer 18 is arranged between the two busbars 2, 3. Both busbars 2, 3 are arranged on the same side of the film stack 4. Each of the two busbars 2, 3 has contact arms 20 pointing inwardly in the radial direction for the electrical contacting of the film stack. The two busbars are fabricated from a conductive material, preferably from metal. Further, the busbars may comprise further contacts (not illustrated in FIG. 2) for contacting the busbars with an external voltage source.

The first busbar 2 is connected to the first sub-region 13 of the first metal layer 9, which covers the first end face 7. The second busbar 3 is electrically connected to the first sub-region 15 of the second metal layer 10, which covers the second end face 8. Further, the second busbar 3 is electrically connected to the second sub-region 14 of the first metal layer 9, which covers the first end face 7. Accordingly, the same potential is applied to the first sub-region 15 of the second metal layer 10 and to the second sub-region 14 of the first metal layer 9.

Further, the second sub-region 16 of the second metallization 10, which covers the second end face 8, is connected to a reference potential 1.

The capacitance of the first capacitor C1, which may be a DC-link capacitor, is formed between the inner electrodes 5, which are connected to the first sub-region 13 of the first metal layer 9 on the first end face 7, and the inner electrodes 5, which are connected to the first sub-region 15 of the second metal layer 10 on the second end face 8.

Further, the capacitances of the second and third capacitor C2, C3 are formed in the regions of the film stack 4 separated by the first and the second separation film 11, 12.

The capacitance of the second capacitor C2 is formed between the inner electrodes 5, which are connected to the first sub-region 13 of the first metal layer 9 on the first end face 7, and the inner electrodes 5, which are connected to the second sub-region 16 of the second metal layer 10 on the second end face 8.

The capacitance of the third capacitor C3 is formed between the inner electrodes 5, which are connected to the second sub-region 14 of the first metal layer 9 on the first end face 7, and the inner electrodes 5, which are connected to the second sub-region 16 of the second metal layer 10 on the second end face 8.

The second and the third capacitor C2, C3 preferably have the same capacitance. The capacitance of the second and third capacitor C2, C3 is preferably lower than the capacitance of the first capacitor C1. The second and the third capacitor C2, C3 have capacitances in the region of several nF, for example.

The three capacitors C1, C2, C3 of the capacitor component are self-healing. Here, the dielectric and the metallization around the breakdown point vaporize, preferably in the event of a short circuit at a single point between two inner electrodes 5 due to high arc temperature, with the result that merely a local hole is produced in the film stack 4, which does not lead to the destruction to the capacitor component.

The exemplary embodiment of the capacitor component shown in FIG. 2 is suitable in particular for a radially symmetrical installation space. Here, the capacitor component is formed annularly, preferably radially symmetrically with respect to an axis of symmetry 19.

FIG. 2 shows a cross section of an annular capacitor component, wherein the busbars 2, 3 have a larger diameter than the first, the second and the third capacitor and are arranged accordingly on the outwardly directed side of the film stack 4.

A possible method for producing the capacitor component according to FIG. 2 will be described hereinafter.

First, a starting empty winding 22 made of a dielectric material is coiled. The active windings of the first capacitor C1 are then wound. Here, the first dielectric films 6.1, which can be metallized on at least one outer face, are coiled. The film stack 4 is wound in such a way that a layer of a metallization and a dielectric layer are arranged alternately along the surface normal of the films 6.1. The metallizations of the dielectric films 6.1 then form the inner electrodes 5.

An electrically insulating separation film 11 is then wound over the active windings of the first capacitor C1.

If the application of the separation film 11 is finished, the metallized second dielectric films 6.2 are then wound over this separation film and form the second capacitor C2 in the finished component.

A second electrically insulating separation film 12 is then wound over the second dielectric films 6.2.

If the application of the second separation film 12 is finished, metallized third dielectric films 6.3 are then wound over the second separation film 12 and form the third capacitor C3 in the finished component. The end empty winding 23 made of a dielectric material is wound over the third capacitor C3.

The two end faces 7, 8 of the film stack 4, which are arranged parallel to the surface normals of the films 6.1, 6.2, 6.3, are then sprayed with a metal layer 9, 10, or what is known as the schoopage layer. In so doing, the metal layer 9 on the first end face 7 is divided by the first separation film 11 into two sub-regions 13, 14, and the metal layer 10 on the second end face 8 is divided by the second separation film 12 into two sub-regions 15, 16.

The busbars 2, 3 are then slid onto the film stack 4, wherein the first insulating layer 17 is provided between the second busbar 3 and the film stack 4 and the second insulating layer 18 is arranged between the two busbars 2, 3. The contact arms 20 of the busbars 2, 3 are then soldered to the metal layer 9, 10 on the end faces 7, 8 of the capacitor component, with the result that the capacitors C1, C2, C3 are connected as shown in the equivalent circuit diagram in FIG. 1.

If the capacitor component is an annular capacitor component, in which the busbars 2, 3 and the film stack 4 are circular or elliptical, the busbars, 2, 3 thus have a larger diameter than the film stack 4 and are accordingly arranged on the outer face of the film stack 4 as viewed from the center point or focal point.

Figure 3:
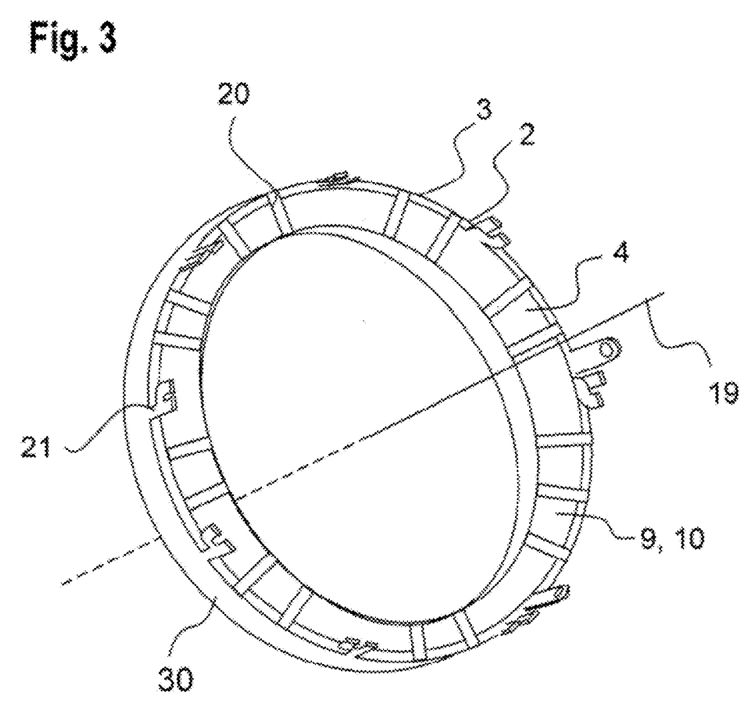
FIG. 3 shows a three-dimensional illustration of the capacitor component.

FIG. 3 shows a three-dimensional view of an annular capacitor component according to the invention with busbars arranged on an outer face 30. For example, the capacitor component comprises a film stack 4 according to FIG. 2. Further, the capacitor component preferably comprises reinforcement elements for supporting the main body 2, which are not illustrated here.

The film stack 4 and the busbars 2, 3 are formed radially symmetrically with respect to an axis of symmetry 19. The two busbars 2, 3 have a larger diameter than the film stack 4, such that they surround the film stack externally. The busbars 2, 3 are thus arranged on the outer face 30 of the annular film stack 4. The busbars 2, 3 further comprise contact arms 20 for the electrical contacting of the film stack 4 and also contacts 21 for providing contact between the busbars 2, 3 and a power supply.

The busbars 2, 3 are produced as a prefabricated component and are slid onto the main body. The prefabricated component preferably already comprises the contact arms 20. The contact arms 20 are then bent inwardly by almost 90° in the direction of the axis of symmetry 19 and are connected, for example welded, to the schoopage layer on the respective end face 7, 8. Accordingly, the potential that is applied via the contacts 21 to the respective busbar 2, 3 is applied to the inner electrodes of the main body, which are contacted with the respective schoopage layer. Alternatively, an embodiment of the capacitor component shown in FIG. 2 for a planar application is also possible. In this case, the film stack 4 and busbars 2, 3 are formed in a planar manner, for example rectangularly.

Figure 4:
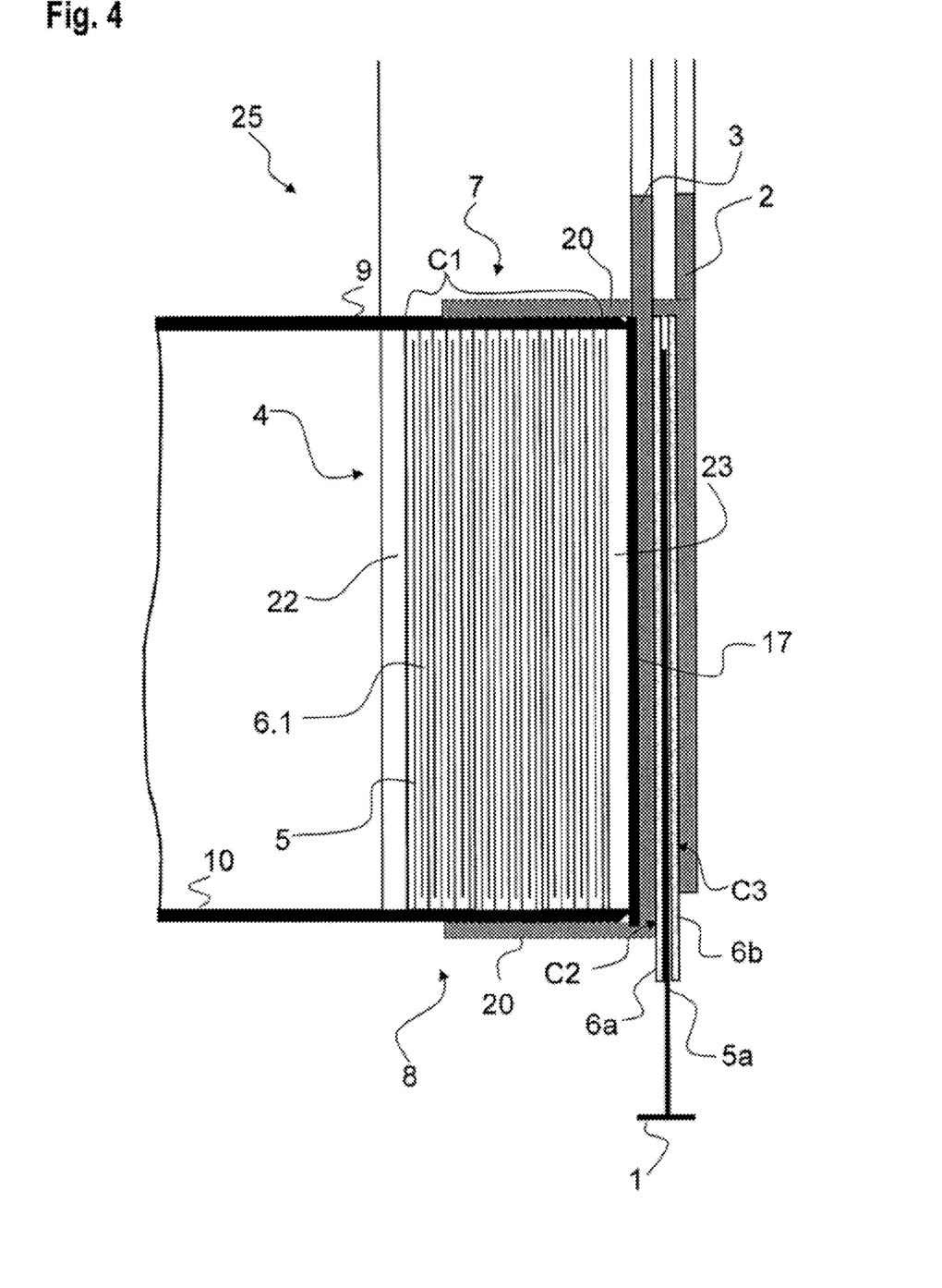
FIG. 4 shows a detail of a second exemplary embodiment of the capacitor component according to the invention.

FIG. 4 shows a second exemplary embodiment of the capacitor component 25 according to the invention. The capacitor component 25 comprises a film stack 4 in which first dielectric films 6.1 are stacked. The first dielectric films 6.1 comprise metallizations. These metallizations form the inner electrodes 5. The metallizations or the inner electrodes 5 are contacted alternately to a first and a second end face 7, 8 of the film stack 4. The end faces 7, 8 of the film stack 4 comprise a metal layer 9, 10. In the exemplary embodiment shown here the film stack 4 forms the capacitance of the first capacitor C1.

In contrast to the exemplary embodiment shown in FIG. 2, the capacitances of the second and third capacitor C2, C3 are not formed by the film stack in this embodiment.

Further, the capacitor component 25 in FIG. 4 comprises two busbars 2, 3. The first busbar 2 is connected to a first end face 7 of the film stack 4 and the second busbar 3 is electrically connected to a second end face 8 of the film stack 4. A metal foil 5a is arranged between the two busbars 2, 3 and is arranged between two dielectric films 6a, 6b. The metal foil 5a is connected to a reference potential 1.

The capacitances of the second and third capacitor C2, C3 are formed by the busbars 2, 3 and the metal foil 5a and the two dielectric films 6a, 6b. The first busbar 2, the metal foil 5a and the dielectric film 6a form the capacitance of the second capacitor C2. The second busbar 3, the metal foil 5b and the dielectric film 6b form the capacitance of the third capacitor C3.

The exemplary embodiment shown in FIG. 4 also implements the circuit shown in the equivalent circuit diagram in FIG. 1. The first capacitor C1 is connected in parallel with the second and third capacitor C2, C3, wherein C2 and C3 are in turn connected in series with one another.

The second exemplary embodiment shown in FIG. 4 is also suitable both for a radially symmetrical installation space and for a planar installation space. In the case of an annular embodiment of the capacitor component, the diameter of the two busbars 2, 3 is selected so as to be larger than the diameter of the film stack 4, with the result that the two busbars 2, 3 adjoin the outer face of the film stack 4. The metal foil 5a and the two dielectric films 6a, 6b are further dimensioned such that they can be inserted between the two busbars 2, 3.

Figure 5A:
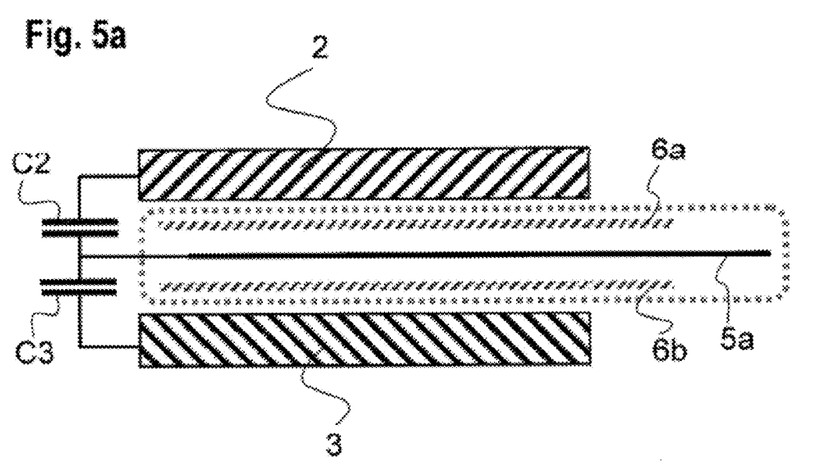
FIG. 5a shows a schematic cross section of the Y capacitor in accordance with the second exemplary embodiment.
Figure 5B:
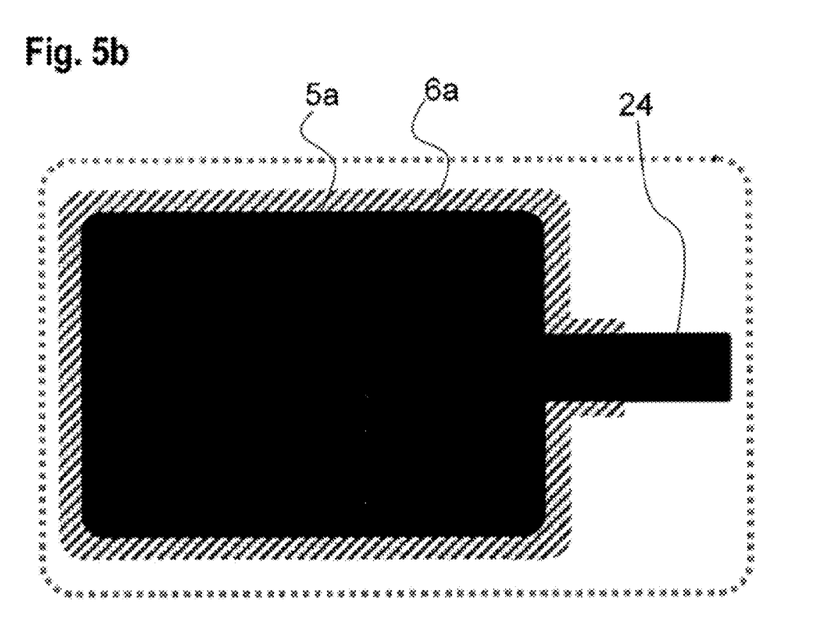
FIG. 5b schematically shows a plan view of a Y capacitor in accordance with the second exemplary embodiment.

FIG. 5a schematically shows the Y capacitor in accordance with the second exemplary embodiment shown in FIG. 4. FIG. 5b shows a plan view of the metal foil 5a and a dielectric film 6a, which is arranged between the metal foil 5a and the first busbar 2. The metal foil 5a further comprises a connection pin 24, which protrudes from the dielectric films 6a. It can be seen in FIG. 5a and FIG. 5b that the dielectric film 6a protrudes beyond the metal foil 5a on all sides, with the exception of the connection pin 24, which protrudes from the dielectric film 6a. The connection pin 24 serves to provide contact between the metal foil 5a and a reference potential 1, which is preferably a ground potential. A further dielectric film 6b is arranged between the metal foil 5a and the second busbar 3 and is structurally identical to the dielectric film 6a.

In accordance with a possible method for producing the capacitor component in accordance with the second embodiment, as shown in FIG. 4, the film stack 4 is first wound on. To this end, a starting empty winding 22 made of a dielectric material is first wound. First dielectric films 6.1 are then wound on and are metallized at least on one side, with the result that a film stack 4, as shown in FIG. 4, is produced. In so doing, the metallizations of the first dielectric films 6.1 form the inner electrodes 5 of the film stack 4.

The end faces 7, 8 of the film stack 4 are sprayed with a metal layer 9, 10 for electrical contacting. The two busbars 2, 3, between which a metal foil 5a and two dielectric films 6a, 6b are arranged, are then slid onto the film stack 4 and are soldered to the metal faces 9, 10 on the end faces 7, 8. The two busbars 2, 3 preferably comprise contact arms 20, which are soldered to the metal faces 9, 10 on the end faces 7, 8.

Figure 6A:
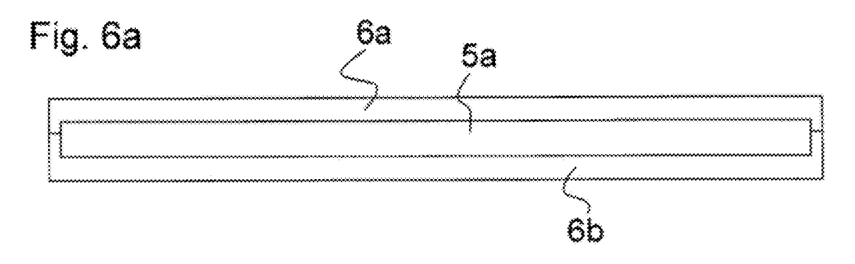
FIG. 6a shows a metal foil encased by dielectric films as part of a Y capacitor, as illustrated in FIGS. 5a and 5b.

FIG. 6a shows a metal foil 5a, which is arranged between two dielectric films 6a, 6b and which is suitable for insertion between the two busbars 2, 3. The dielectric films 6a, 6b are polyamide films, for example. The metal foil 5a is an aluminum foil, for example.

For example, in order to produce the arrangement from FIG. 6a, a dielectric film 6a is coated with an adhesive and is first rolled out flat. A metal foil 5a is then applied to the polyamide film 6a and this metal foil 5a is covered by a further dielectric film 6b, wherein an adhesive is likewise applied between the metal foil 5a and the further dielectric film 6b. The film stack formed of the dielectric film 6a, metal foil 5a and the further dielectric film 6b is then compressed and heated, with the result that a stable connection is produced. The films 5a, 6a, 6b of the film stack remain flexible here, with the result that they are suitable for the installation between two annular busbars 2, 3 as shown in FIGS. 3 and 4. This production method is referred to as a pass-through lamination method.

Figure 6B:
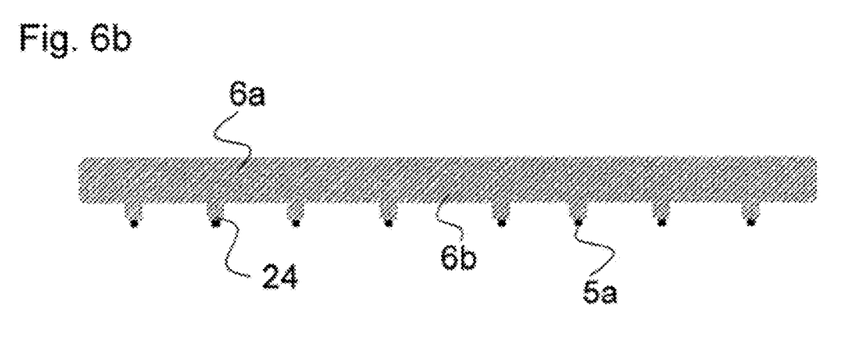
FIG. 6b shows the metal foil encased by dielectric films from FIG. 6a in plan view.

FIG. 6b shows a stack formed of two dielectric films 6a, 6b, between which a metal foil 5a is encased, in plan view. Connection pins 24 protrude on one side of the stack. The connection pins 24 are part of the metal foil 5a, wherein the connection pins 24 protrude from the dielectric films 6a, 6b. These connection pins are ground connections. Due to the elongate form of the metal foil 5a, a number of ground connections are selected in order to avoid asymmetry. Apart from the connection pins 24, the rest of the metal foil 5a is encased between the dielectric films 6a, 6b and therefore cannot be seen in FIG. 6b.

Figure 7A:
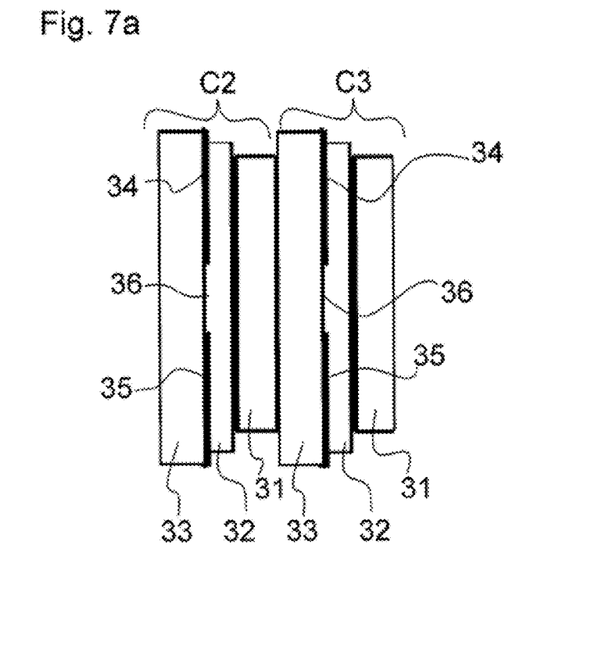
FIG. 7a shows a cross section through films of the second and of the third capacitor in an alternative exemplary embodiment.
Figure 7B:
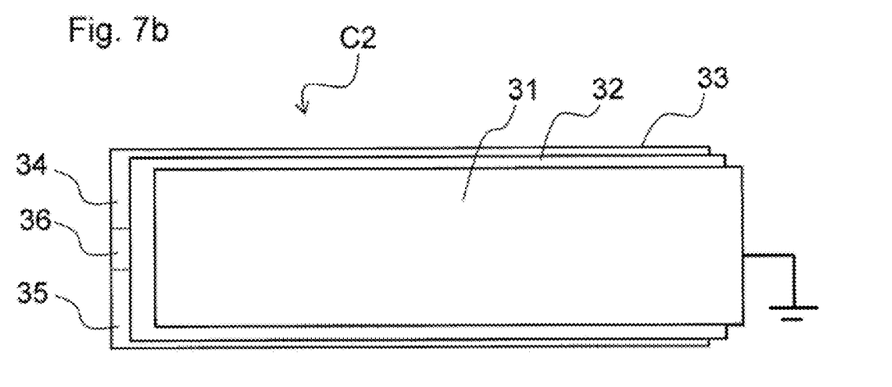
FIG. 7b shows the films of the second capacitor in accordance with the alternative exemplary embodiment in plan view.

If a flexible metal foil 5a is encased between two dielectric films 6a, 6b in a pass-through lamination method, as illustrated in FIGS. 7a and 7b, and is then inserted between two busbars 2, 3, an undesirable air gap can be produced between the dielectric films 6a, 6b and the busbars 2, 3. The capacitance of the second and/or third capacitor C2, C3 may thus be falsified.

In a variation of the pass-through lamination method, the side of the dielectric films 6a, 6b facing away from the encased metal foil 5a are therefore covered at least in part by a metal layer. The creation of an air gap can thus be avoided.

In a further variation of the pass-through lamination method, the encased metal foil 5a terminates flush with the dielectric films 6a, 6b, wherein the metal foils 5a further comprise connection pins 24 however that protrude from the dielectric films 6a, 6b and which produce a connection between the metal foils 5a and a reference potential 1. An insulation can be achieved by an additional element, which can be arranged at each of the ends of the stack formed of metal foil 5a and dielectric films 6a, 6b. Here, the insulation may be a further adhesive film for example, which covers the ends of the stack.

The side of the dielectric films 6a, 6b facing away from the encased metal foil 5a may likewise be laminated with a further metal layer. A further variation of the second exemplary embodiment is possible within the scope of the present invention. In this case, a number of metallized dielectric films are arranged between the busbars 2, 3. Here, the metallized faces of the films are connected to one another and to the busbars 2, 3 in such a way that a number of second capacitors C2 and a number of third capacitors C3 are produced.

A pair consisting of a second and a third capacitor C2, C3 is connected here in series and is further connected in parallel with the further pairs of second and third capacitors C2, C3.

FIGS. 7a and 7b show a further embodiment of the second and third capacitor C2, C3 which are parts of the Y capacitor. The second and third capacitor C2, C3 are connected in series with one another and in parallel with the first capacitor C1. Each of the two capacitors C2, C3 comprises a stack-shaped structure, which comprises a number of films. The films of the second and third capacitor C2, C3 can be wound, as shown in FIG. 2, jointly with the films of the first capacitor C1 to form a film stack, which is separated by separation films into various capacitances. Alternatively the films of the second and third capacitor C2, C3 can be combined with the exemplary embodiment shown in FIG. 4, in which the films of the second and third capacitor C2, C3 are arranged between two busbars.

FIG. 7a shows the stack-shaped structure of the second and third capacitor C2, C3 in cross section. FIG. 7b shows the structure of one of the two capacitors C2, C3 in plan view, wherein the individual films are displaced relative to one another in order to illustrate the structure more clearly.

The second capacitor C2 comprises a metal foil 31, for example an aluminum-containing foil, as the lowermost layer along the stack direction. A dielectric film 32, which for example is formed as a polypropylene layer not coated by means of vapor deposition, is arranged on the metal foil 31 along the stack direction. A partly metallized film 33 is arranged above the dielectric film 32 along the stack direction. The partly metallized film comprises a polypropylene layer, onto which a first and a second metallized region 34, 35 are vapor-deposited. The metallized regions are strip-shaped here. In the wound-on state, the strips run parallel to one another and radially about the axis of symmetry of the component. A non-metallized region 36 is arranged between the metallized regions 34, 35. The non-metallized region may be a polypropylene strip that is not coated by means of vapor deposition.

A potential can be applied to each of the two metallized regions 34, 35. The metal foil 31 can further be connected to ground. Accordingly, a first capacitance of the second capacitor C2 forms between the first metallized region 34 and the metal foil 31. A second capacitance of the second capacitor C2 forms between the second metallized region 35 and the metal foil 31. The first and the second capacitance are connected in series with one another and, as an inner series circuit, form the total capacitance of the second capacitor C2.

The third capacitor C3, which is arranged above the second capacitor C2 along the stack direction, has an identical structure.

The region between the first and second metallized regions 34, 35 and the metal foil 31 is self-healing. The region between the non-metallized region 36 and the metal foil 31 is non-self-healing. In the event of a short circuit at a single point, the dielectric and the metallization around the breakdown point vaporize between two electrodes, formed by the metallizations 34, 35 and the metal foil 31, as a result of high arc temperature. Merely a local hole is thus formed in the film stack and does not lead to the destruction of the capacitor component. If, however, there is no electrode in the regions between the non-metallized region 36 of the partly metallized film 33 and the metal foil 31, the vaporization is not locally delimited and a large region of the capacitor component is destroyed. These regions are non-self-healing accordingly.

If the second and the third capacitor C2, C3 are formed by the inner series circuit, described here, of two capacitances, they thus have an improved current-carrying capacity and an improved pulse loading capacity.

LIST OF REFERENCE SIGNS

C1—first capacitor
C2—second capacitor
C3—third capacitor
E1_C1—first electrode of the first capacitor
E2_C1—second electrode of the first capacitor
E1_C2—first electrode of the second capacitor
E2_C2—second electrode of the second capacitor
E1_C3—first electrode of the third capacitor
E2_C3—second electrode of the third capacitor
—reference potential
2, 3—busbar
4—film stack
5—inner electrode
6.1—first dielectric film
6.2—second dielectric film
6.3—third dielectric film
5a—metal foil
6a, 6b—dielectric film
7, 8—end face of the film stack
9, 10—metal layer
11, 12—separation film
13, 14—sub-region of the first end face 7
15, 16—sub-region of the second end face 8
17—insulation layer
18—insulation layer
19—axis of symmetry
20—contact arm
21—contacts of the busbar
22—starting empty winding
23—end empty winding
24—connection pin
25—capacitor component
26—connection pin
27—connection pin
30—outer face
31—metal foil
32—dielectric film
33—partly metallized film
34—first metallized regions
35—second metallized regions
36—non-metallized regions

The invention claimed is:

1. A capacitor component, comprising:
an integrated first capacitor;
an integrated Y capacitor, which has a second capacitor and a third capacitor,
wherein the second and the third capacitor are connected in series with one another and in parallel with the first capacitor, and
wherein the capacitor component is annular; and
a first and second busbar for the joint electrical contacting of the first capacitor, the second capacitor and the third capacitor,
wherein the first and second busbars, the first capacitor, the second capacitor and the third capacitor annularly surround a common axis, and
wherein at least one of the first and second busbars has a larger diameter than the first, the second and the third capacitor.

2. The capacitor component according to claim 1, having a main body, which has a film stack comprising a number of inner electrodes and dielectric films arranged therebetween,
wherein the second and the third capacitor are fitted on the main body, or the second and the third capacitor are formed by the main body.

3. The capacitor component according to claim 2, having a first and a second electrically insulating separation film, which separate the film stack into the first, the second and the third capacitor.

4. The capacitor component according to claim 1, wherein a first and a second outer face of the capacitor component are covered at least in part by a metal layer.

5. The capacitor component according to claim 4, wherein the metal layer on the first outer face is separated by the first electrically insulating separation film into a first and a second sub-region insulated from one another, and
wherein the metal layer on the second outer face is separated by the second electrically insulating separation film into a first and a second sub-region insulated from one another.

6. The capacitor component according to claim 5, wherein the first busbar is electrically connected to the first sub-region of the metal layer on the first outer face,
wherein the second busbar is connected to the first sub-region of the metal layer on the second outer face and to the second sub-region of the metal layer on the first outer face, and
wherein the second sub-region of the metal layer on the second outer face is connected to a reference potential.

7. The capacitor component according to claim 1, wherein each of the first and second busbars has a larger diameter than the first, the second and the third capacitor.

8. The capacitor component according to claim 1, wherein the Y capacitor is arranged between the first and second busbars.

9. The capacitor component according to claim 8, wherein the Y capacitor has a metal foil, a first dielectric film and a second dielectric film,
wherein the metal foil is connected to a reference potential and is encased between the first and the second dielectric film, and
wherein the metal foil and the first and second dielectric films are arranged between the first and second busbars in such a way that the second capacitor is formed by the first busbar, the metal foil and the first dielectric film, and the third capacitor is formed by the second busbar, the metal foil and the second dielectric film.

10. The capacitor component according to claim 8, wherein a number of metal foils are arranged between the first and second busbars and are each encased between two dielectric films,
wherein a number of second and third capacitors of the Y capacitor are formed by the dielectric films, the metal foils and the first and second busbars, and
wherein a second and third capacitor are in each case connected in series with one another and in parallel with the further capacitors.

11. A method for producing a capacitor component according to claim 1, wherein the first capacitor is formed from inner electrodes with dielectric films arranged therebetween,
- wherein a first separation film is fitted on the first capacitor,
- wherein the second capacitor is formed of inner electrodes with dielectric films arranged therebetween and is formed on the first separation film,
- wherein a second separation film is fitted on the second capacitor,
- wherein the third capacitor is formed of inner electrodes with dielectric films arranged therebetween and is formed on the second separation film, and
- wherein the first and second busbars are slid onto the first, second and third capacitor, and the first and second busbars are electrically contacted with the first, second and third capacitors.

12. A method for producing a capacitor component according to claim 1, wherein the first capacitor is formed of inner electrodes with dielectric films arranged therebetween,
- wherein the first and second busbars are slid onto the first capacitor, and the first and second busbars are electrically contacted with the first capacitor, and
- wherein a metal foil, which is encased between two dielectric films, is inserted between the first and second busbars.

13. A capacitor component, having an annular main body, comprising:
- a film stack,
- wherein inner electrodes and dielectric films are alternatingly stacked, which surrounds an axis and has an outer face, of which a surface normal points away from the axis in a radial direction,
- wherein the inner electrodes are contacted alternately to a first end face and a second end face of the film stack; and
- a first and second busbar arranged on the outer face,
- wherein the first busbar is electrically connected to the first end face of the film stack and the second busbar is electrically connected to the second end face of the film stack.

* * * * *